Patented Sept. 11, 1951

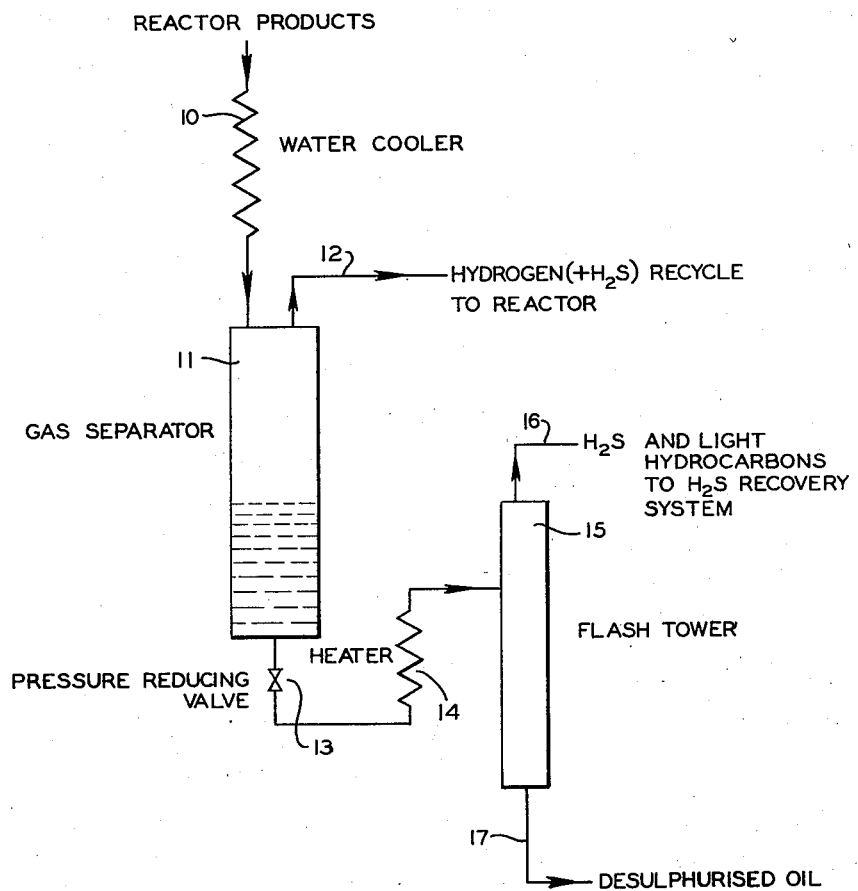

2,567,252

UNITED STATES PATENT OFFICE 2,567,252

REFINING OF HYDROCARBONS

Leslie Christopher Strang, Sunbury-on-Thames, England, assignor to Anglo-Iranian Oil Company Limited, London, England, a British joint-stock corporation Application July 20, 1949, Serial No. 105,855

3 Claims. (Cl. 196—28)

The invention relates to a method of desulphurisation of light or heavy hydrocarbon feedstocks, particularly those of petroleum origin.

It is well known to carry out the desulphurisation of such oils by passing the oil over a catalyst in the presence of hydrogen at temperatures up to about 1000° F. or more, and at pressures varying from atmospheric up to about 200 atmospheres and even higher.

A wide range of catalysts are known in the desulphurisation refining of such feedstocks of which the following are typical—the oxides and sulphides of aluminium, iron, nickel, cobalt, chromium, molybdenum, copper, manganese and tungsten, metals such as sodium, potassium, lithium, calcium, zinc, aluminium, manganese, iron, nickel, cobalt, or copper, and compounds such as molybdates, thiomolybdates, thiotungstates, and aluminates of metals of the 6th group either alone or in combination with other catalysts.

Under known conditions the desulphurisation is carried out by hydrogenation of the sulphur compounds present into $H_2S$, and the operating conditions vary according to the type of oil processed and on the forms of combined sulphur present in the oil. It is customary to separate, either by flashing or by fractionation, a hydrogen and $H_2S$ containing fraction from the refined oil. The $H_2S$ is removed from the hydrogen for example by being dissolved in water and the hydrogen recycled to the desulphurising zone. It is not uncommon, particularly in the case of refining light spirits, to give the spirit a final treatment to remove the last traces of $H_2S$.

The applicant has found that appreciable economies may be effected simply by recycling the hydrogen containing $H_2S$ to the process, and contrary to expectation he has found that the $H_2S$ does not tend to build up in concentration in the hydrogen. If the conditions are carefully controlled he has found that the concentration built up will generally not exceed 2%, and that such concentrations have no appreciable effect on the desulphurisation reaction.

According to the invention therefore a sulphur containing oil is passed, in the presence of hydrogen, over a desulphurising catalyst in a reaction zone, under conditions of hydrogen partial pressure, flow-rate, elevated temperature and superatmospheric pressure selected to effect desulphurisation of the oil without substantial cracking. The reaction product leaving the desulphurisation zone is cooled under the elevated pressure used in the reaction zone to a temperature at which the reaction product, except for a gaseous hydrogen fraction for recycling generally containing varying proportions of hydrogen sulphide and methane with small amounts of other hydrocarbon gases, is condensed, the conditions being carefully controlled such that the content of hydrogen sulphide in the recycle fraction generally does not exceed 2% mol, has no appreciable effect on the desulphurisation reaction, does not build up to an extent to have an appreciable effect thereon, and the whole of the hydrogen sulphide thereafter formed during the reaction will be dissolved in the feedstock. The gaseous recycle fraction is separated from the condensate formed and is recycled to the desulphurising zone. The balance of the reaction product containing in solution hydrogen sulphide, a certain amount of hydrogen, and some of the lighter hydrocarbon gases, is thereupon passed to a flash column wherein the light ends are removed either by the application of heat or by reduction of pressure, or by the application of heat and reduction of pressure.

The light ends of the hydrocarbon product may be treated for the recovery of $H_2S$ according to known methods, as for example by treatment in an absorber-tower with water scrubbing. The $H_2S$ rich water from the base of the absorber-tower may then be passed under the tower pressure to sprays at the top of a desorber-tower wherein a counter-current scrubbing with air may take place.

The gas from the absorber-tower may not generally contain sufficient hydrogen to justify its being recycled to the desulphurisation process, and it may therefore be passed to the fuel gas or may otherwise be disposed of.

The invention comprises the conditions hereinafter described by way of an example of the process of the invention applied to the desulphurisation of gas oil of Iranian origin having the following characteristics:

Sp. Gr. at 60° F., .841
I. B. P. °C., 224.5
F. B. P. °C., 370
Aniline point °C., 74.4
Refractive index, 1.4679
Per cent sulphur (by weight), 0.67

The gas oil was passed at a rate of one volume per volume of catalyst per hour over a catalyst consisting of molybdenum trioxide deposited on alumina maintained at a temperature of 750° F., while the pressure in the desulphurising zone was maintained at 1000 lbs./sq. in. The quantity of hydrogen kept recycling was approximately 4,000 cu. ft. per barrel of feedstock. Under these conditions no substantial degree of cracking occurred, and during a period of 84 hours on stream the average sulphur removal was 95%. At the end of the run the catalyst was still active and a sulphur removal of 94% was being obtained.

The concentration of $H_2S$ in the recycled hydrogen quickly built up to a mol. percentage of 1.1, and thereafter did not increase throughout the run. The whole of the $H_2S$ formed thereafter was removed in the liquid gas oil product together with hydrogen and light hydrocarbon gases.

Taken over the whole run the average composition of the recycle hydrogen was as follows:

| | Percent mol. |
|---|---|
| $H_2$ | 96.9 |
| $C_1+$ | 2.0 |
| $H_2S$ | 1.1 |

The liquid gas oil product was passed via a pressure-reducing valve to a heater and thence to a flash column to separate substantially the content of dissolved hydrogen sulphide and dissolved hydrogen in said product.

The average analysis of the gases thereby released over the entire run was as follows:

| | Percent mol. |
|---|---|
| $H_2$ | 44 |
| $C_1+$ | 14 |
| $H_2S$ | 42 |

The gases were passed to the base of an absorber-tower packed with Raschig rings and operating under a pressure of 35 lbs./sq. in. Water at a rate equivalent to one gallon per standard cubic foot of gas, was fed to the top of the tower and the water containing the $H_2S$ was passed under the tower pressure to a spray in the top of a desorber-tower, while air was supplied to the base of the tower. The desorber-tower was operated at a pressure of 0.75 lb./sq. in. The gas passing overhead contained approximately 16% $H_2S$ and 76.2% of air.

The method of separating the recycle gas will be more clearly understood from a consideration of the accompanying diagrammatic drawing in conjunction with the foregoing description of the desulphurisation of gas oil. The products leaving the desulphurisation zone and consisting of gas oil vapour, hydrogen sulphide, hydrogen and some light hydrocarbons, are passed to a water cooler 10 where they are cooled to substantially room temperature (70° F.). From the cooler 10 the products pass into a gas separator 11 maintained under the pressure obtaining in the desulphurisation zone. At 70° F. the solubility of hydrogen sulphide in gas oil is 5.0 vol./vol. gas oil/atmosphere partial pressure of hydrogen sulphide, and the gas separated out under a pressure of 1000 lb./sq. in. contains 1.1% mol. hydrogen sulphide. This gas is recycled to the desulphurisation zone via line 12 and compressor (not shown). The liquid from the separator 11 consisting of liquid gas oil containing dissolved hydrogen sulphide, hydrogen and some light hydrocarbons, is then passed via a pressure-reducing valve 13 to a heater 14 and thence to a flash column 15 from which hydrogen sulphide, hydrogen and light hydrocarbons pass overhead through line 18 and desulphurised gas oil is removed as a bottoms product through line 17.

This application is continuation-in-part of the applicant's co-pending application, Serial No. 611,251, filed August 17, 1945, now abandoned, and the invention is of general application to processes of hydrofining.

What is claimed is:

1. In a process for the hydrocatalytic desulphurization of sulphur-containing hydrocarbon feedstocks, carried out in a desulphurizing zone in the presence of hydrogen and in the presence of a desulphurization catalyst under conditions of hydrogen partial pressure, flow-rate, elevated temperature and super-atmospheric pressure selected to effect desulphurization of the feedstock without any substantial degree of cracking, the steps comprising maintaining the reaction product leaving the desulphurization zone at substantially the pressure employed in the reaction zone and reducing the temperature of the reaction product to a selected condensing temperature at which the reaction product, except for a gaseous hydrogen fraction for recycling containing varying proportions of hydrogen sulphide and methane with small amounts of other hydrocarbon gases, is condensed; separating said uncondensed gaseous hydrogen fraction from the condensate under the aforesaid conditions whereby the content of hydrogen sulphide in the gaseous hydrogen fraction for recycling does not build up to an extent to have an appreciable effect on the desulphurization reaction and the whole of the hydrogen sulphide thereafter formed during the reaction will be dissolved in the condensate and recycling said gaseous fraction to the desulphurizing zone; passing said condensate to a flash zone; and, removing from said condensate in said flash zone substantially the content of dissolved hydrogen sulphide and dissolved hydrogen in said product.

2. In a process for hydrofining hydrocarbon feedstocks for the removal of sulphur, carried out without any substantial degree of cracking in a reaction zone under conditions of elevated temperature and superatmospheric pressure in the presence of hydrogen and in the presence of a desulphurization catalyst, the steps comprising maintaining the reacted hydrocarbon product under the elevated pressure employed in the reaction zone and reducing the temperature to substantially room temperature, separating a gaseous recycle fraction from said hydrocarbon products under the aforesaid conditions wherein the content of hydrogen sulphide does not build up to an extent to have an appreciable effect on the desulphurization reaction and the whole of the hydrogen sulphide thereafter formed during the reaction will be dissolved in the feedstock, and recycling said gaseous fraction to the desulphurizing zone; passing the balance of said hydrocarbon product to a flash zone and removing from said product in said zone substantially the content of dissolved hydrogen sulphide and dissolved hydrogen in said product.

3. In a process for hydrofining hydrocarbon feedstocks for the removal of sulphur, carried out without any substantial degree of cracking in a reaction zone under conditions of elevated temperature and super-atmospheric pressure in the presence of hydrogen and in the presence of a desulphurization catalyst, the steps comprising cooling the reaction product to substantially room temperature under substantially the pressure used in the reaction zone to obtain a liquid hydrocarbon product containing hydrogen sulphide in solution and a gaseous hydrogen fraction for recycling, said fraction having a content of hydrogen sulphide not exceeding 2% mol, recycling said fraction to said reaction zone, reducing the pressure on said product, adding heat to said product at the reduced pressure, and removing from the heated product substantially the content of dissolved hydrogen sulphide and dissolved hydrogen in said heated product.

LESLIE CHRISTOPHER STRANG.

REFERENCES CITED

The following references are of record in the file of this patent:

UNITED STATES PATENTS

| Number | Name | Date |
| --- | --- | --- |
| 2,282,451 | Brooks | May 12, 1942 |
| 2,315,144 | Watson | Mar. 30, 1943 |
| 2,417,308 | Lee | Mar. 11, 1947 |